United States Patent
Dziedzic

(10) Patent No.: US 8,251,451 B2
(45) Date of Patent: Aug. 28, 2012

(54) DISC RECLINER ASSEMBLY WITH BIASED SYNCHRONIZATION

(75) Inventor: Jerzy Dziedzic, Milford, MI (US)

(73) Assignee: Intier Automotive Inc., Newmarket (CA)

(*) Notice: Subject to any disclaimer, the term of this patent is extended or adjusted under 35 U.S.C. 154(b) by 447 days.

(21) Appl. No.: 12/523,113

(22) PCT Filed: Jan. 16, 2008

(86) PCT No.: PCT/CA2008/000064
§ 371 (c)(1),
(2), (4) Date: Jul. 14, 2009

(87) PCT Pub. No.: WO2008/086598
PCT Pub. Date: Jul. 24, 2008

(65) Prior Publication Data
US 2010/0127546 A1    May 27, 2010

(51) Int. Cl.
*B60N 2/235* (2006.01)
(52) U.S. Cl. .............. 297/367 P; 297/366; 297/367 R
(58) Field of Classification Search .......... 297/354.1, 297/354.11, 366, 367 R, 367 P
See application file for complete search history.

(56) References Cited

U.S. PATENT DOCUMENTS

| | | | |
|---|---|---|---|
| 4,218,092 A * | 8/1980 | Schach et al. | 297/367 R |
| 5,634,689 A | 6/1997 | Putsch et al. | |
| 6,082,821 A | 7/2000 | Baloche et al. | |
| 6,402,249 B1 | 6/2002 | Rohee et al. | |
| 6,543,849 B1 | 4/2003 | Yamada | |
| 6,626,495 B2 * | 9/2003 | Okazaki et al. | 297/367 R |
| 6,726,281 B2 | 4/2004 | Baloche | |
| 6,758,525 B2 | 7/2004 | Uramichi | |
| 6,837,530 B2 | 1/2005 | Rudberg et al. | |
| 7,055,906 B2 | 6/2006 | Shinozaki | |
| 7,150,503 B2 | 12/2006 | Ohba | |
| 7,407,230 B1 * | 8/2008 | Luo et al. | 297/367 R |
| 7,648,205 B2 * | 1/2010 | Zou et al. | 297/367 R |
| 7,766,428 B2 * | 8/2010 | Ng et al. | 297/367 R |
| 2005/0052063 A1 * | 3/2005 | Volker et al. | 297/369 |
| 2005/0212339 A1 * | 9/2005 | Ham | 297/362 |
| 2006/0022503 A1 | 2/2006 | Reubeuze et al. | |
| 2007/0040436 A1 | 2/2007 | Oki | |
| 2007/0102981 A1 * | 5/2007 | Pejathaya | 297/367 |
| 2008/0217980 A1 * | 9/2008 | Zou et al. | 297/362 |

FOREIGN PATENT DOCUMENTS

| | | |
|---|---|---|
| CA | 2610715 A1 | 1/2007 |
| WO | 2004103764 A1 | 12/2004 |
| WO | 2006105657 A1 | 10/2006 |

* cited by examiner

*Primary Examiner* — David Dunn
*Assistant Examiner* — Philip Gabler
(74) *Attorney, Agent, or Firm* — Miller Canfield

(57) ABSTRACT

A recliner assembly provides pivotal movement of a seat back relative to a seat cushion for a vehicle seat. The recliner assembly includes a rotatable rod extending between a first end and a second end. A first recliner is fixedly coupled to the first end of the rod and is operable between a locked condition wherein the seat back is fixed relative to the seat cushion and an unlocked condition wherein the seat back is selectively pivotally adjustable. A second recliner is operatively coupled to the second end of the rod and is operable between the locked condition and the unlocked condition. A bushing is disposed between the second recliner and the rod. The bushing biases the second recliner against the rod to synchronize the first and second recliners to unlock simultaneously. The bushing also provides a lost motion connection to allow the first and second recliners to lock independently.

18 Claims, 9 Drawing Sheets

DISC RECLINER ASSEMBLY WITH BIASED SYNCHRONIZATION

BACKGROUND OF THE INVENTION

1. Field of the Invention

The invention relates to a recliner assembly for pivotally adjusting a seat back relative to a seat cushion of an automotive vehicle seat. More particularly, the invention relates to a recliner assembly including a spring bushing for synchronizing a pair of disc recliners to unlock simultaneously and providing a lost motion connection allowing the disc recliners to lock independently.

2. Description of Related Art

Automotive vehicles include seat assemblies for supporting a seated occupant in the vehicle. The seat assemblies typically include a generally horizontal seat cushion and a generally vertical or upright seat back pivotally connected to the seat cushion by a recliner assembly. The recliner assembly allows selective pivotal adjustment of the seat back relative to the seat cushion between a plurality of reclined positions. Each of the seat cushion and seat back commonly include a rigid frame structure supporting a cellular foam pad that is encased by a fabric trim cover.

Disc recliners are well known in the vehicle seating art and are commonly used to pivotally connect the seat back to the seat cushion. Typically, disc recliners include a cylindrical outer disc fixedly secured to the seat cushion and a cylindrical inner disc fixedly secured to the seat back and rotatably coupled to the outer disc. Disc recliners further include an internal locking mechanism for locking the inner and outer discs together to thereby maintain the angular position of the seat back relative to the seat cushion. The locking mechanism typically includes an annular rim of teeth on the inner disc and several pawls each with a plurality of teeth. The pawls are movable, either slidingly or pivotally, in a radial direction between an engaged position and a disengaged position. With the pawls in the engaged position, the teeth on the pawls are interlocked or meshingly engaged with the rim of teeth on the inner disc, thus locking the inner and outer discs together and maintaining the angular position of the seat back relative to the seat cushion. When the pawls are moved from the engaged position to the disengaged position, the teeth on the pawls are spaced from the rim of teeth on the inner disc, thus allowing rotation of the inner disc relative to the outer disc and thereby providing adjustment of the seat back relative to the seat cushion.

The seat assemblies commonly include an inboard disc recliner and an outboard disc recliner which are coupled together by a rod or cross-talk tube so that only one recliner lever or release handle is required to operate the seat back. Typically, the recliner lever is coupled to the cross-talk tube adjacent the outboard recliner. Ideally, when the occupant manipulates the recliner lever to adjust the relative angle of the seat back or other desired operation of the seat back, the inboard and outboard recliners are synchronized and unlock simultaneously. Likewise, when the recliner lever is released the recliners lock simultaneously, preventing further movement of the seat back.

A problem arises when the prior art seat assemblies are manufactured and assembled. If the inboard recliner is not perfectly aligned with and extending parallel to the outboard recliner, the recliners will not be properly mounted on the cross-talk tube joining the recliners. Improper mounting causes the recliners to bind, increasing the effort required to operate the seat back. In addition, imperfect alignment of the recliners may result in the inboard recliner remaining open or unlocked after the recliner lever is released, thereby holding the outboard recliner unlocked. This situation arises when the recliner lever is released and the teeth on the pawls of the inboard recliner are in tip-to-tip or tooth-to-tooth engagement with the rim of teeth on the inner disc. In this condition, the pawls are prevented from returning to the locked position such that the inboard recliner will remain unlocked, and because the inboard and outboard recliners are joined by the cross-talk tube, the outboard recliner will also remain unlocked. Imperfect alignment is common within normal acceptable build tolerances.

In International Patent Publication Number WO2006105657 a bushing is operatively connected between a cross-talk tube and a locking mechanism of an inboard recliner. The bushing provides a lost motion connection between the cross-talk tube and the locking mechanism such that imperfect alignment of the inboard and outboard recliners does not allow the inboard recliner, when the locking mechanism is in a tooth-to-tooth condition, to hold the outboard recliner unlocked after the recliner lever is released. In other words, due to the lost motion connection the inboard and outboard recliners can lock independently.

It is desirable to provide a recliner assembly including an improved lost motion connection or spring bushing coupled between a cross-talk tube and a locking mechanism of an inboard recliner to allow the inboard recliner and an outboard recliner to lock independently and to also synchronize the inboard and outboard recliners to unlock simultaneously.

SUMMARY OF THE INVENTION

According to one aspect of the invention, a recliner assembly is provided for pivotal movement of a seat back relative to a seat cushion for an automotive vehicle seat. The recliner assembly includes a rotatable rod that extends between a first end and a second end. The recliner assembly also includes a first recliner that is fixedly coupled to the first end of the rod. The first recliner is operable between a locked condition wherein the seat back is fixed relative to the seat cushion and an unlocked condition wherein the seat back is selectively pivotally adjustable. The recliner assembly further includes a second recliner that is operatively coupled to the second end of the rod. The second recliner is operable between the locked condition and the unlocked condition. In addition, the recliner assembly includes a bushing that is disposed between the second recliner and the rod. The bushing biases the second recliner against the rod to synchronize the first and second recliners to unlock simultaneously. The bushing also provides a lost motion connection to allow the first and second recliners to lock independently.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE PREFERRED EMBODIMENT

Figure 1:
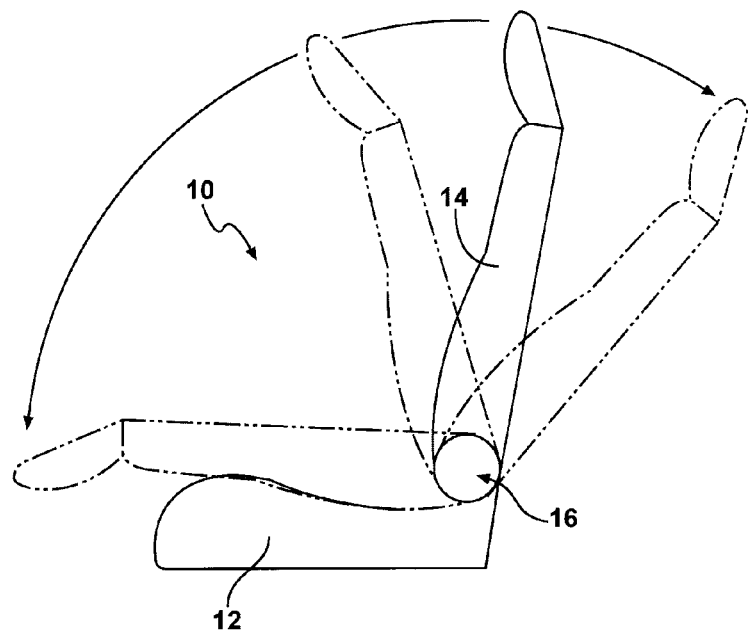
FIG. 1 is a side view of a seat assembly illustrating pivotal adjustment of a seat back by a recliner assembly according to the invention.

Referring to the Figures, FIG. 1 discloses a seat assembly generally shown at 10 for use in an automotive vehicle. The seat assembly 10 includes a seat cushion 12 and a seat back 14 for supporting a seat occupant in the vehicle. Each of the seat cushion 12 and seat back 14 typically include a rigid frame structure for supporting a contoured, foam pad encased by a trim cover as is well known to one skilled in the art. The seat assembly 10 also includes a recliner assembly, generally indicated at 16, interconnecting the seat cushion 12 and seat back 14 for pivotal movement of the seat back 14 relative to the seat cushion 12 between a plurality of reclined positions.

Figure 2:
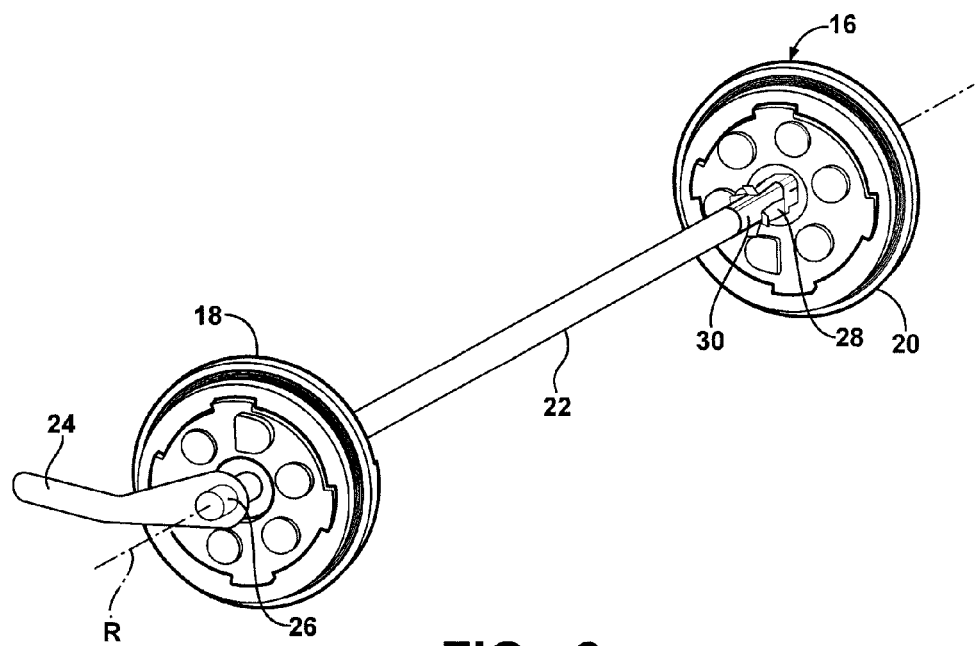
FIG. 2 is a perspective view of the recliner assembly of FIG. 1 including a master disc recliner and a slave disc recliner.

Referring to FIG. 2, the recliner assembly 16 includes a pair of spaced apart disc recliners. More specifically, the recliner assembly 16 includes a master or outboard disc recliner 18 and a slave or inboard disc recliner 20. The master 18 and slave 20 recliners are coupled together by a hollow rod or cross-talk tube 22 defining a rotational axis R. Both the master 18 and slave 20 recliners are symmetrically opposite, which minimizes tooling and ultimately costs. The recliner assembly 16 also includes a recliner lever 24 fixedly secured to a first end 26 of the cross-talk tube 22 adjacent the master recliner 18. The seat occupant manipulates the recliner lever 24 to actuate the recliner assembly 16 in order to adjust the angle of the seat back 14 relative to the seat cushion 12.

The master recliner 18 is secured to or integrally formed with the first end 26 of the cross-talk tube 22 such that manipulating the recliner lever 24 actuates the master recliner 18 between a locked condition in which the seat back 14 is prevented from moving relative to the seat cushion 12 and an unlocked condition in which the angle of the seat back 14 can be adjusted relative to the seat cushion 12. Ideally, the slave recliner 20 actuates between the locked and unlocked conditions simultaneously with the master recliner 18. However, due to manufacturing tolerances and relative alignment of the master 18 and slave 20 recliners, accommodation must be made to ensure synchronization of the master 18 and slave 20 recliners. Therefore, a spring bushing 28 is disposed between a second or distal end 30 of the cross-talk tube 22 and the slave recliner 20, as will be described in further detail below.

Figure 3:
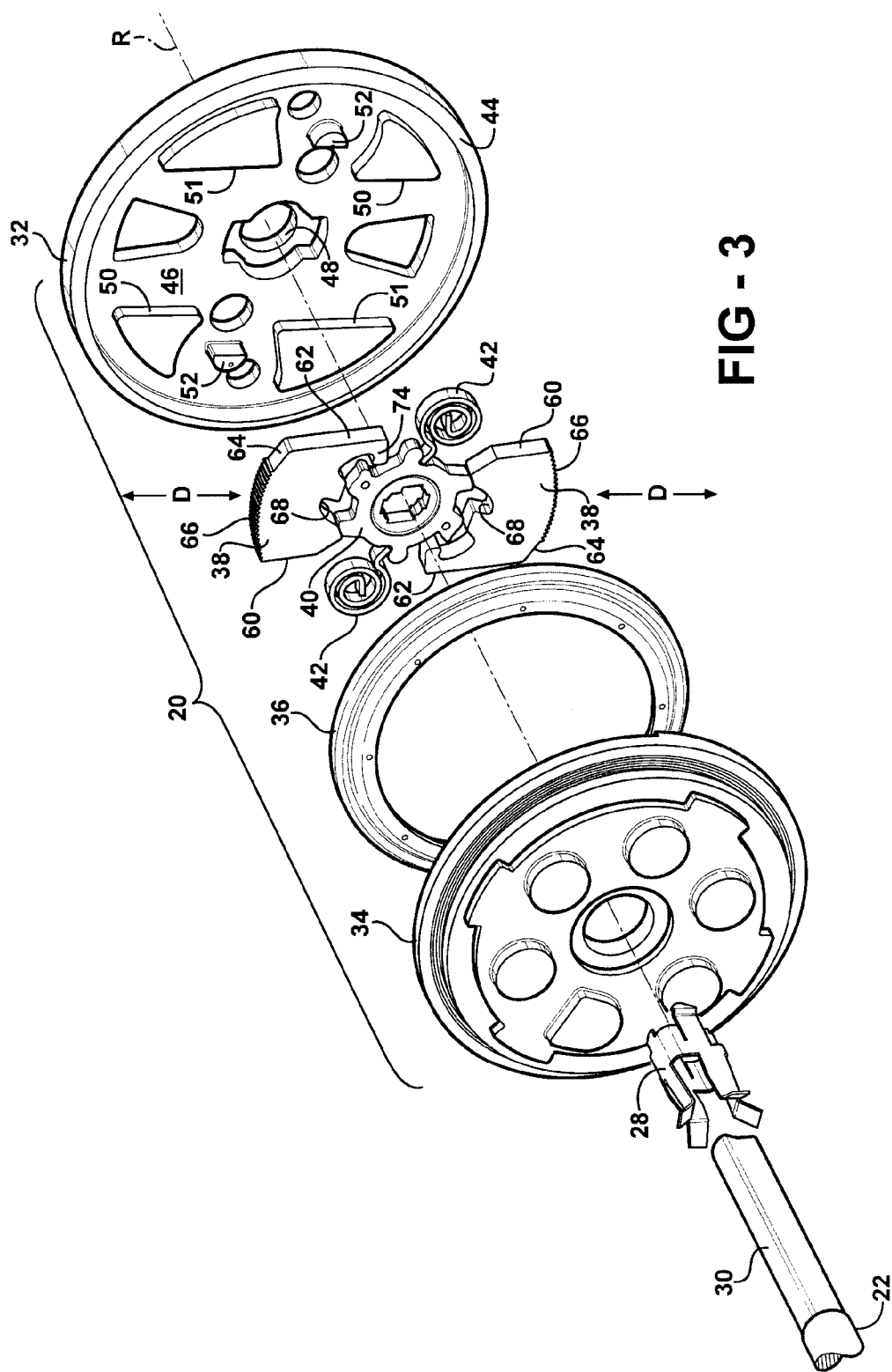
FIG. 3 is an exploded perspective view of the slave disc recliner of FIG. 2.

Referring to FIG. 3, the slave recliner 20 is shown in detail. The slave recliner 20 includes a pair of opposing plates, specifically a fixed plate 32 and a rotary plate 34. The fixed plate 32 is adapted to be mounted to the seat cushion 12 and the rotary plate 34 is adapted to be mounted to the seat back 14. The fixed plate 32 and the rotary plate 34 are circumferentially held together by a fastener or retaining ring 36 in a manner well known in the art so that the rotary plate 34 can move or rotate relative to the fixed plate 32 about the rotational axis R. The slave recliner 20 also includes a locking mechanism that can prevent the rotary plate 34 from rotating relative to the fixed plate 32, and thereby lock the slave recliner 20. The locking mechanism includes a pair of toothed sliding pawls 38, a cam 40, and a pair of torsion springs 42 mounted between the fixed 32 and rotary 34 plates.

Figure 4:
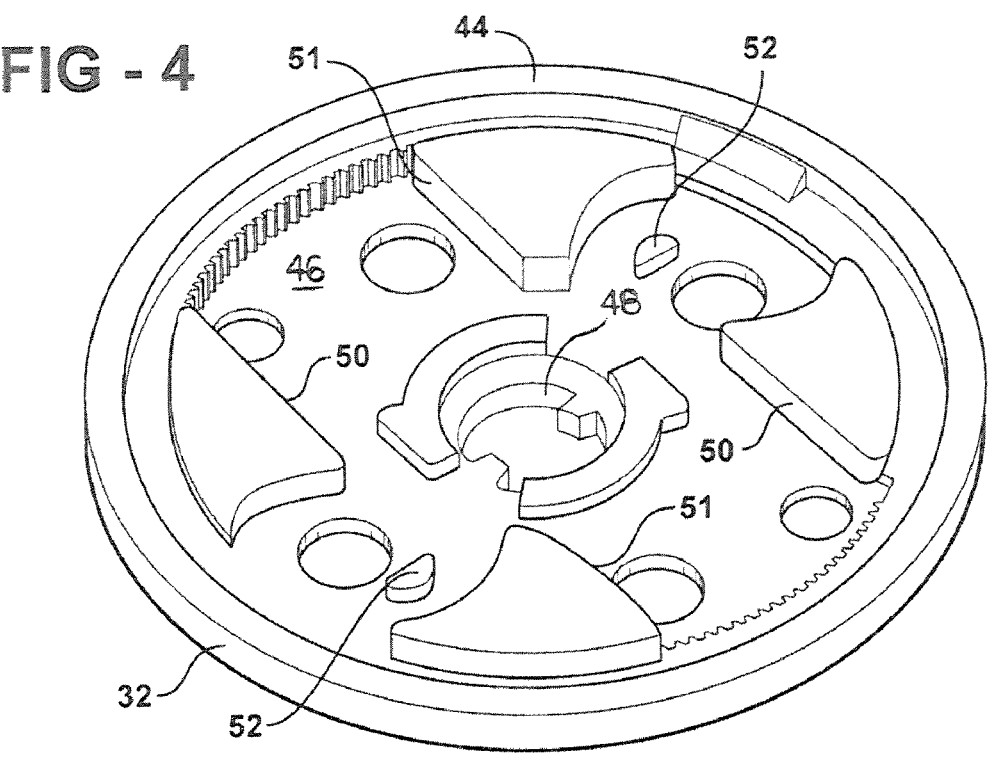
FIG. 4 is a perspective view of a fixed plate of the slave disc recliner of FIG. 3.

Referring to FIG. 4, the fixed plate 32 is generally cup-shaped and includes a circumferentially extending outer flange 44 defining an inner surface or cavity 46, and a central bore 48. Positioned in the cavity 46 are a series of islands that define a pair of first guide walls 50 and a pair of second guide walls 51 spaced apart from and opposing the first guide walls 50. The first 50 and second 51 guide walls cooperate with the pawls 38 to guide the pawls 38 in a radial direction. A pair of diametrically opposed posts 52 are positioned normal to the radial direction of travel of the pawls 38.

Figure 5:
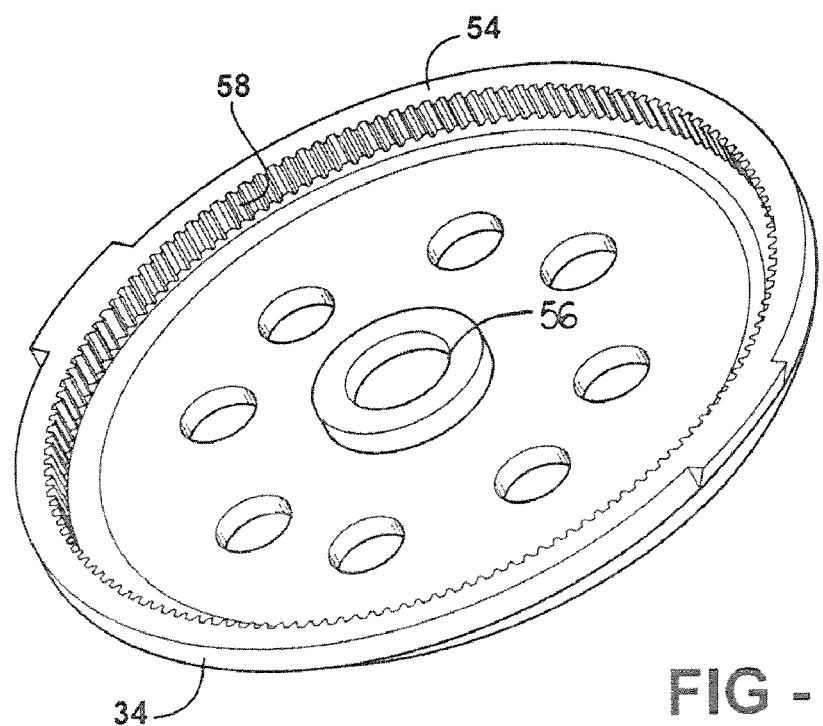
FIG. 5 is a perspective view of a rotary plate of the slave disc recliner of FIG. 3.

Referring to FIG. 5, the rotary plate 34 is generally cup-shaped and includes a circumferentially extending flange 54 and a central bore 56. An inner surface of the flange 54 has a series of spaced teeth 58. The flange 54 is sized to fit within the outer flange 44 of the fixed plate 32.

Figure 6:
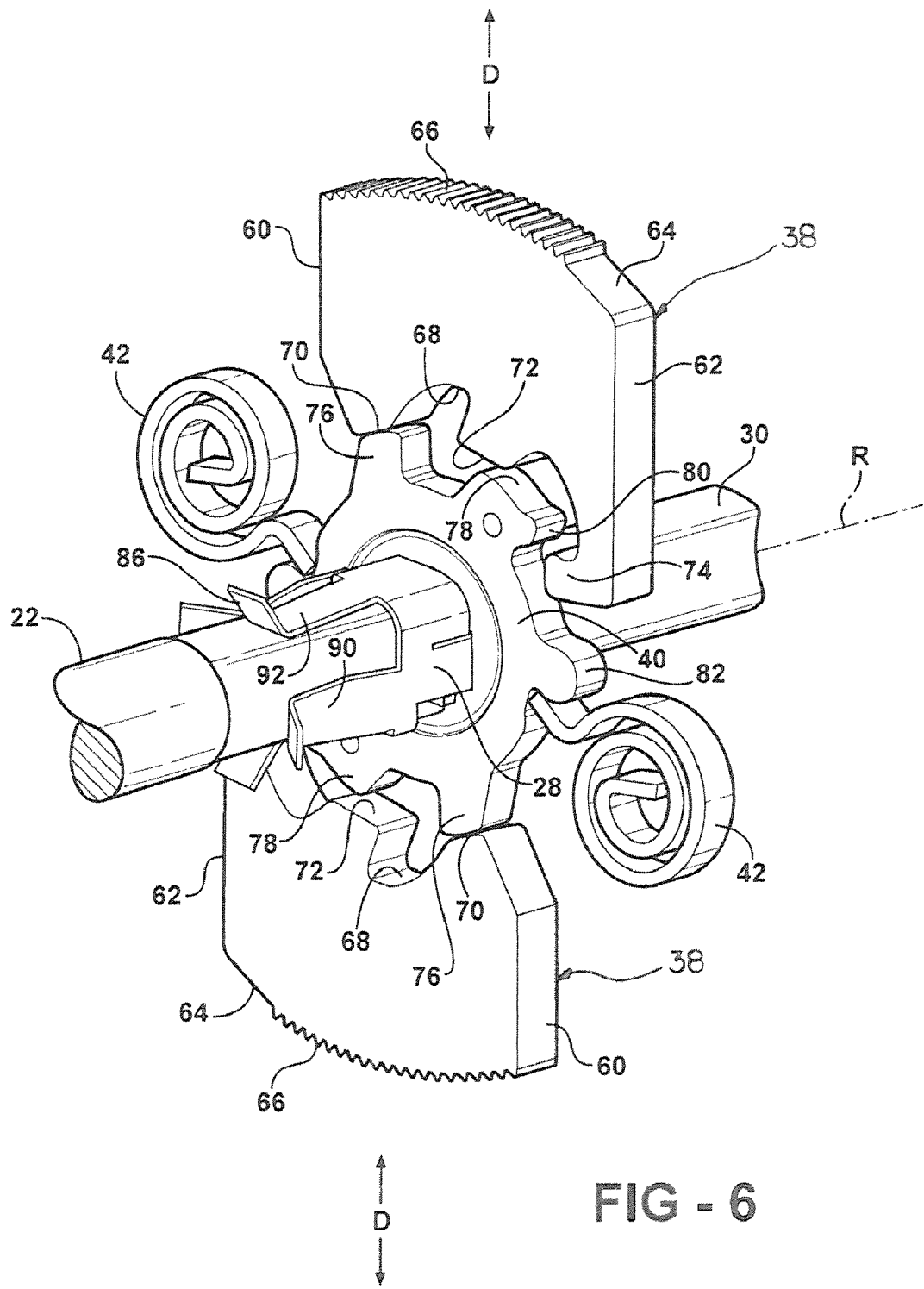
FIG. 6 is a perspective view of a cam and pawl arrangement of the slave disc recliner of FIG. 3.

Referring to FIG. 6, the pawls 38 are formed in a common shape to each other and are slidably mounted to the fixed plate 32. Each pawl 38 has linear side surfaces 60, 62 substantially parallel to each other and extending along the respective first 50 and second 51 guide walls in the fixed plate 32. Thus, the pawls 38 can vertically slide or shift in the direction shown by arrow D. An outer peripheral edge 64 of each of the pawls 38 has a convex shape with a series of teeth 66 for releasably meshingly engaging a portion of the teeth 58 on the rotary plate 34. An inner peripheral edge 68 of each of the pawls 38 has a cam follower surface defined by lobes 70, 72 and a release hook 74.

Figure 7:
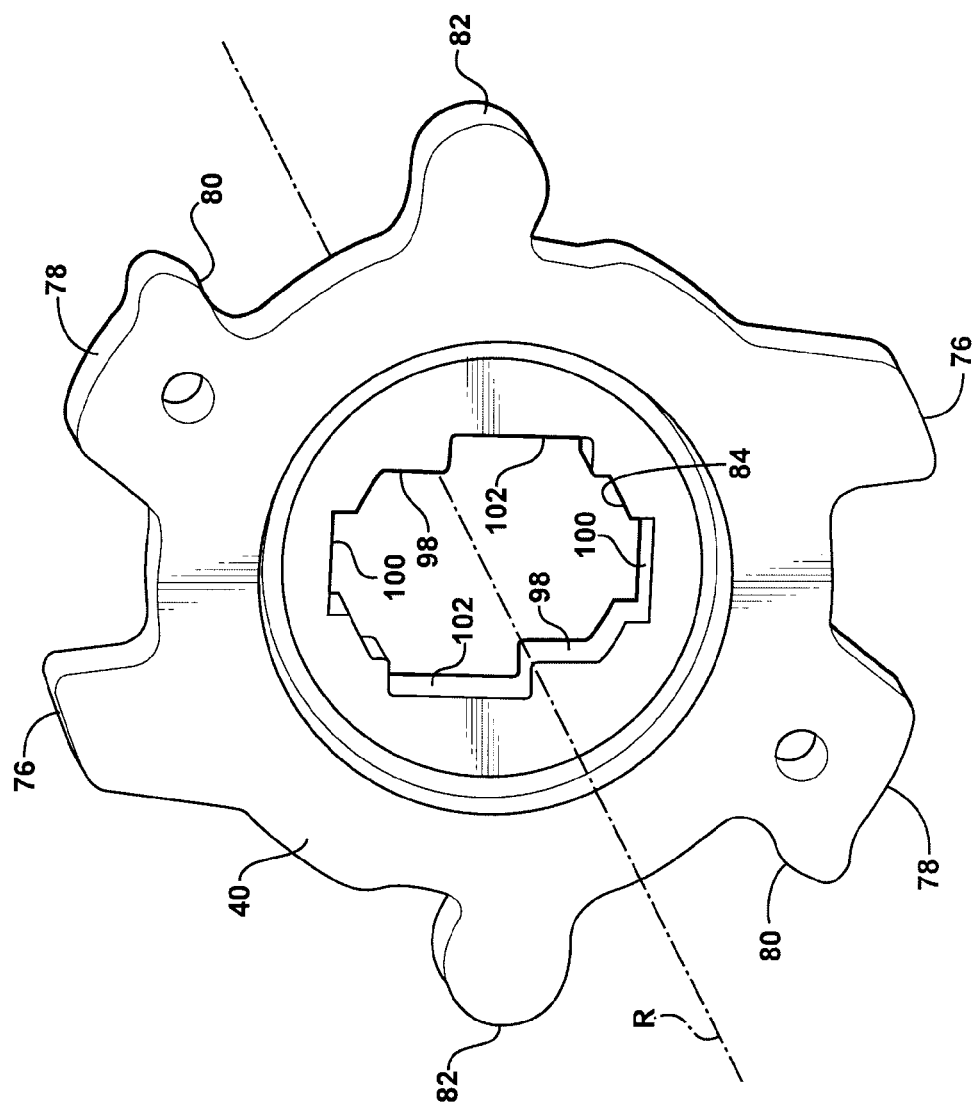
FIG. 7 is a perspective view of the cam of the slave disc recliner of FIG. 3.

Referring to FIGS. 6 and 7, the cam 40 is rotatably disposed between the pair of pawls 38 for rotation about the rotational axis R. The cam 40 includes a cam surface defined by a pair of diametrically opposed first lobes 76 and a pair of diametrically opposed second lobes 78. The first 76 and second 78 lobes are in contact with the respective lobes 70, 72 of the pawls 38 when the cam 40 is in a locked position, such that the teeth 66 on the pawls 38 are meshingly engaged with the teeth 58 on the rotary plate 34 and the slave recliner 20 is in the locked condition. Each of the second lobes 78 defines a hook end 80 for engaging the release hook 74 on the pawls 38. The cam 40 has a degree of free motion wherein the cam 40 rotates without effecting movement of the pawls 38. As the cam 40 rotates in a clockwise direction (when viewed from FIG. 3) about the rotational axis R and the hook end 80 initially engages the release hook 74. In this ready position, the cam 40 maintains the pawls 38 in the locked condition. Further rotation of the cam 40 pulls the pawls 38, such that the teeth 66 on the pawls 38 are disengaged or spaced apart from the teeth 58 on the rotary plate 34 and the slave recliner 20 is in the unlocked condition.

The cam 40 is always urged in a counterclockwise direction (when viewed from FIG. 3) toward the locked position by the torsion springs 42. Each spring 42 extends between one of the posts 52 mounted to the fixed plate 32 and a spring receiving portion 82 provided on the cam surface of the cam 40. The springs 42 are wound in a direction so as to generate a torque urging the cam 40 in the counterclockwise direction toward the locked position.

Referring to FIGS. 7 through 11, the cam 40 includes a specially shaped central bore 84 for receiving the spring bushing 28 therein. In one embodiment of the invention, the spring bushing 28 is made of spring steel and is snap-fitted into the central bore 84. More specifically, the spring bushing 28 has a sleeve body 85 that extends between an inner end 86 and an outer end 88. The sleeve body 85 is sized to surround the second end 30 of rod 22. The inner end 86 of the spring bushing 28 includes a pair of spaced apart and diametrically opposed holding tabs 90 and a pair of spaced apart and diametrically opposed biasing tabs 92. Biasing tabs 92 are offset 90° from the holding tabs 90. The holding tabs 90 and the biasing tabs 92, each has a leg portion and bent foot portion. The outer end 88 of the spring bushing 28 includes a pair of spaced apart guide tabs 94 and a pair of spaced apart and offset retaining tabs 96.

Figure 9:
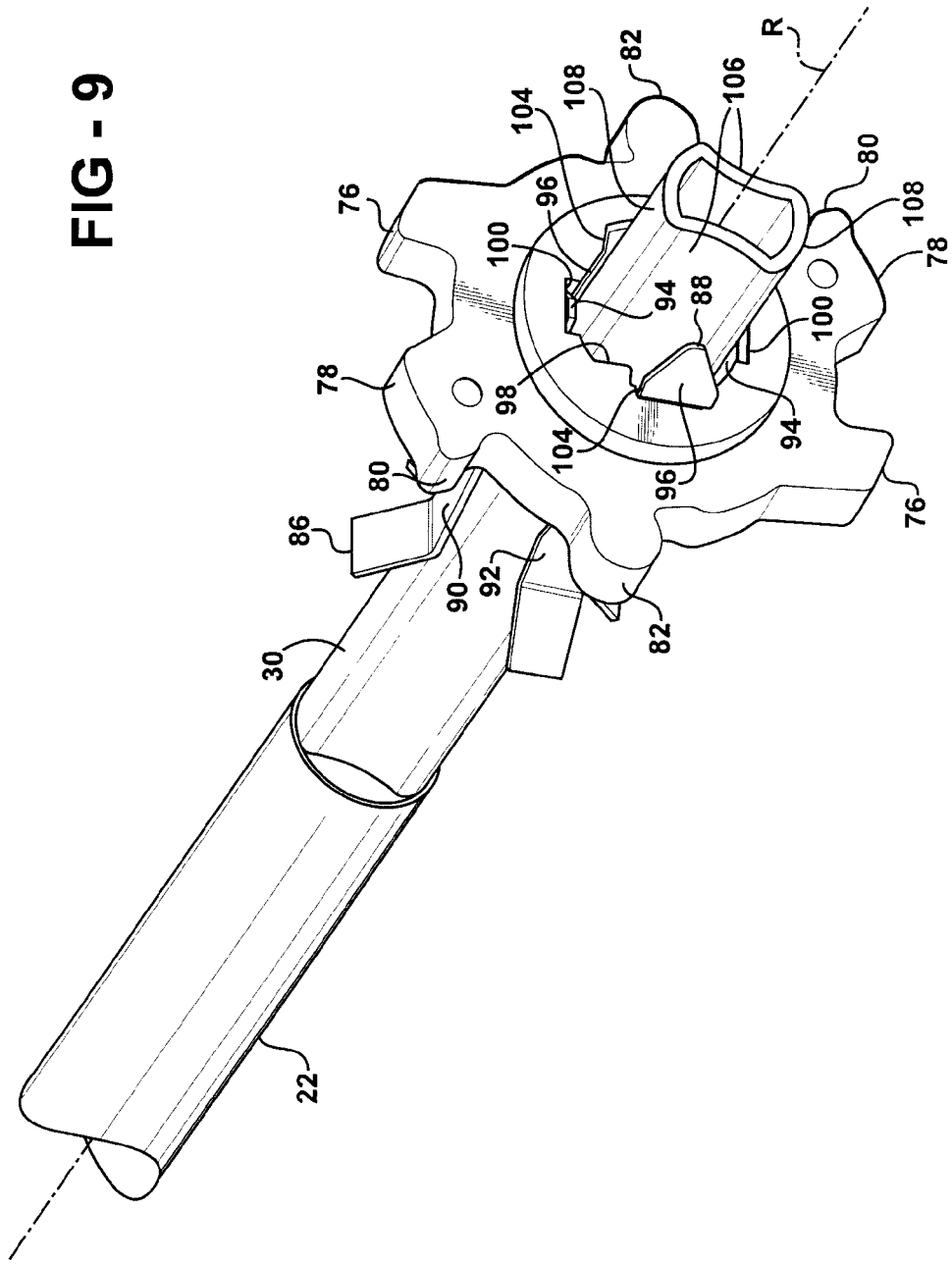
FIG. 9 is an outer perspective view of the bushing snap-fitted into the cam of FIG. 3.
Figure 10:
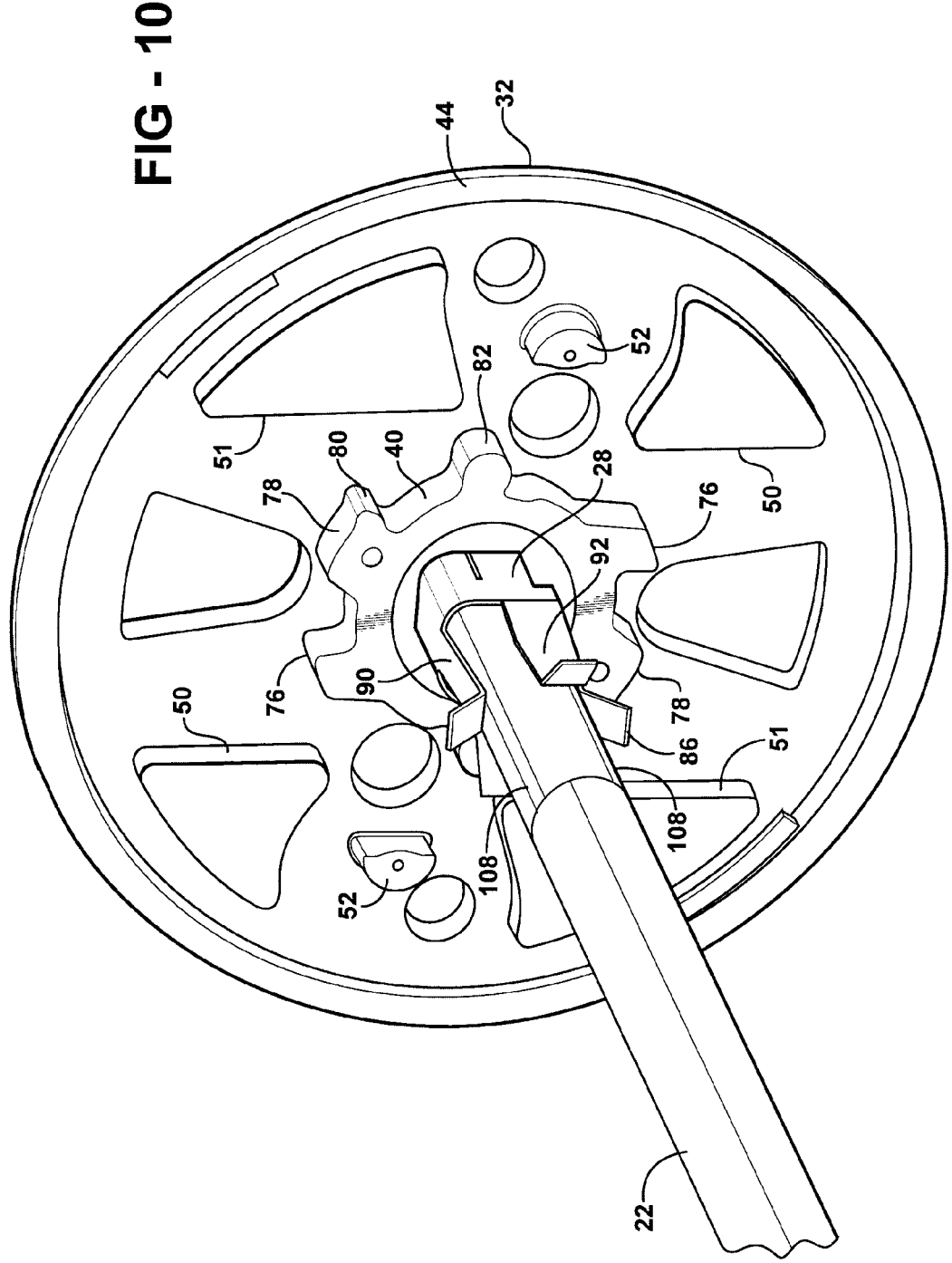
FIG. 10 is an inner perspective view of the bushing snap-fitted into the cam of FIG. 3.

The central bore 84 of the cam 40 includes a plurality of recesses reversely symmetrical formed therearound defining a pair of opposing and offset drive surfaces 98, a pair of opposing guide surfaces 100, and a pair of opposing and offset retainer surfaces 102, as shown in FIG. 7. The spring bushing 28 is configured to generally complement the central bore 84 and is inserted into the cam 40. The guide tabs 94 engage the guide surfaces 100 to align the spring bushing 28 within the cam 40, and the retaining tabs 96 engage the retainer surfaces 102 and include a step 104 to securably and snappingly retain the spring bushing 28 and cam 40 together, as shown in FIG. 9.

Figure 8:
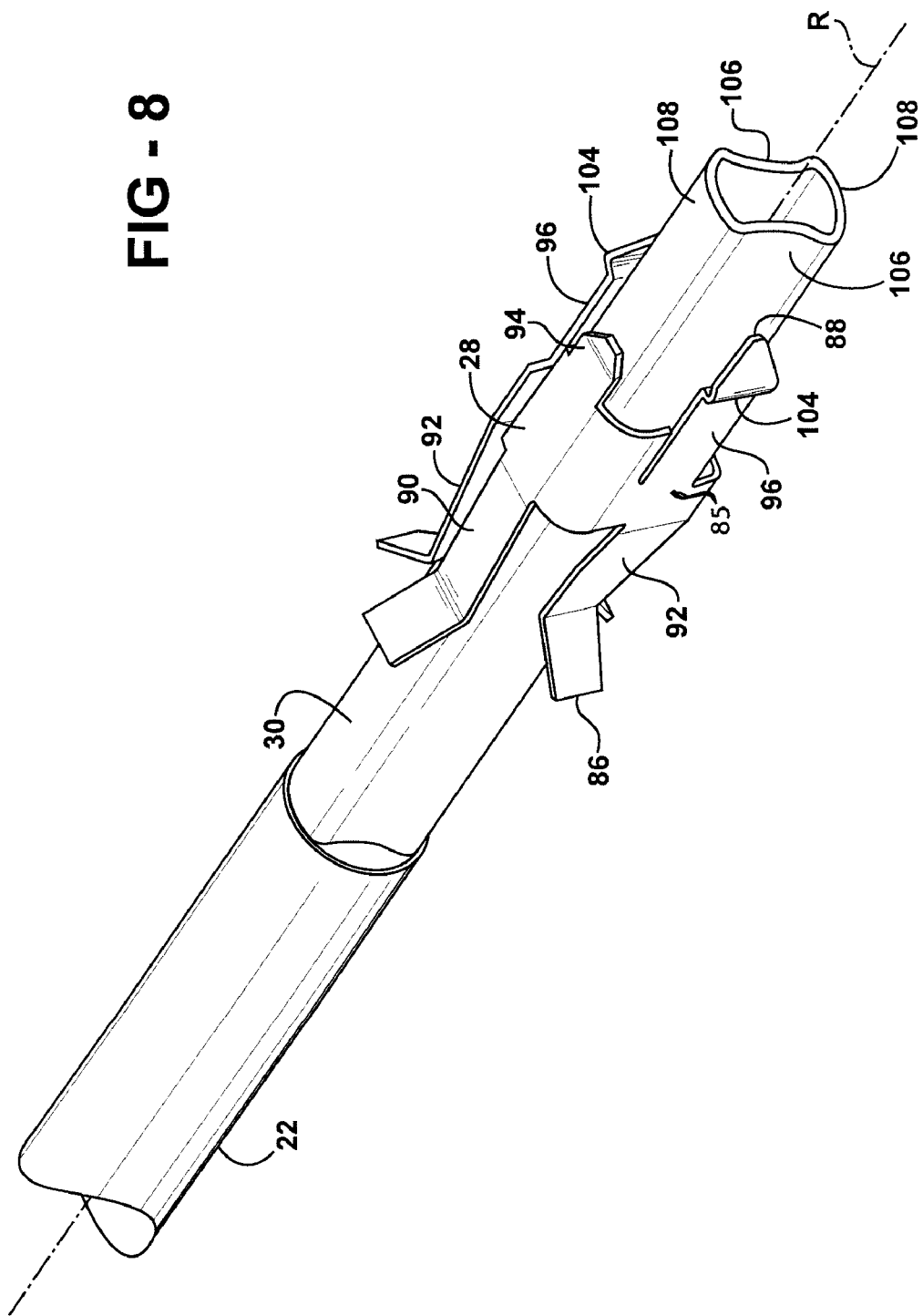
FIG. 8 is a perspective view of a bushing and cross-talk tube of FIG. 3.
Figure 11:
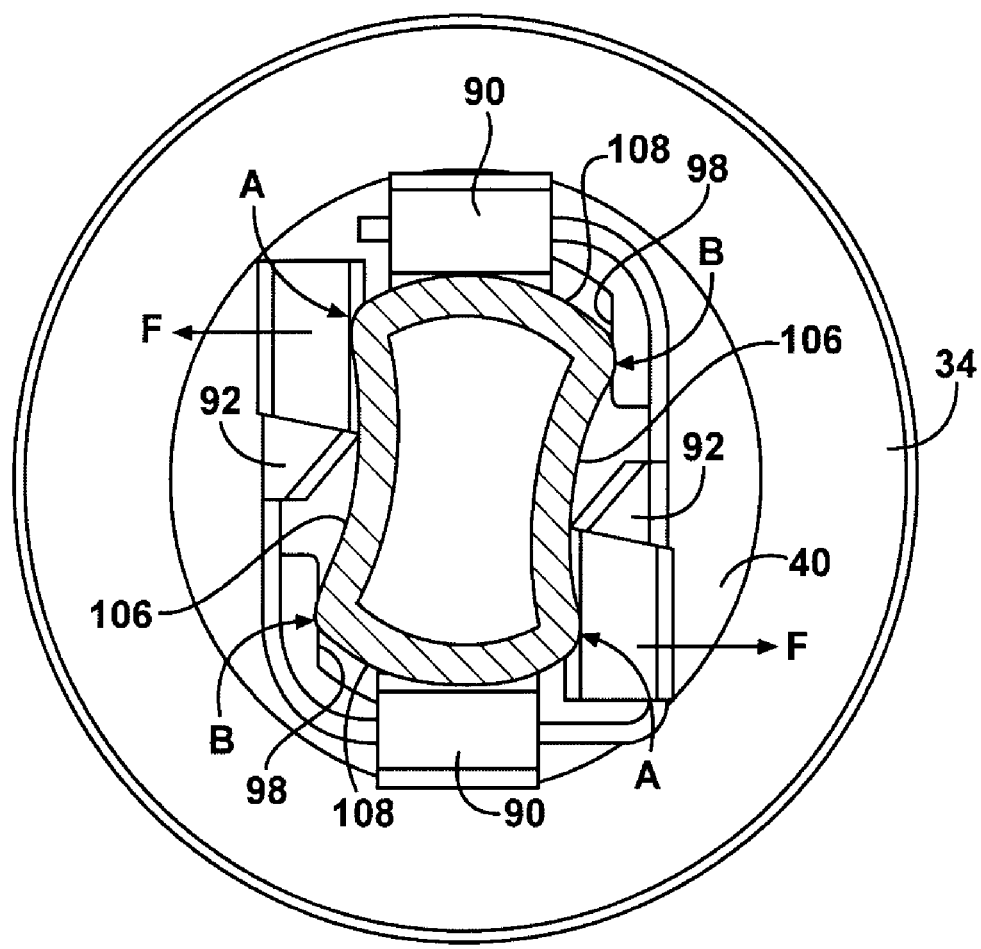
FIG. 11 is a cross-sectional view taken along lines 11-11 of FIG. 2.

Referring to FIG. 8, the second end 30 of the cross-talk tube 22 is generally rectangular having a pair of opposed concave sides 106 and a pair of opposed convex sides 108. The second end 30 of the cross-talk tube 22 is inserted through the spring bushing 28. The offset biasing tabs 92 at the inner end 86 of the spring bushing 28 springingly engage diametrically opposed concave sides 106. As the tube 22 rotates, the biasing tabs 92 will engage corners of the respective concave sides 106 of the cross-talk tube 22 at A, as shown in FIG. 11, thereby increasing reactionary forces in the direction of arrow F. The reactionary forces bias or preload the cam 40 in the counterclockwise direction such that the drive surfaces 98 of the cam 40 abut diametrically opposite corners of the cross-talk tube 22 at B, as shown in FIG. 11. In this ready position, the cam 40 is in the lock position and further rotation will initiate unlocking movement.

Since the drive surfaces 98 of the cam 40 are biased against the cross-talk tube 22, the master 18 and slave 20 recliners are synchronized such that rotating the cross-talk tube 22 in the clockwise direction will simultaneously actuate the master 18 and slave 20 recliners. Thus, the spring bushing 28 automatically compensates for differences in orientation between the master 18 and slave 20 recliners.

The holding tabs 90 engage the respective convex sides 108 of the cross-talk tube 22 to prevent buzz, squeak, and rattle between the cross-talk tube 22 and the spring bushing 28.

In operation, when it is desired to adjust the angular position of the seat back 14 relative to the seat cushion 12 the seat occupant manipulates the recliner lever 24. Lifting the recliner lever 24 causes the cross-talk tube 22 to rotate in the clockwise direction (when viewed from FIG. 2) actuating the master recliner 18 from the locked condition to the unlocked condition. At the same time, referring to the slave recliner 20, the second end 30 of the cross-talk tube 22 rotates in the clockwise direction causing the cam 40 to also rotate in the clockwise direction toward the unlocked position. As the cam 40 rotates in the clockwise direction, the hook end 80 of the second lobes 78 engages the release hook 74 on the pawls 38, pulling the pawls 38 inward. When the cam 40 is in the unlocked position the teeth 66 on the pawls 38 are disengaged from the teeth 58 on the rotary plate 34 and the slave recliner 20 is in the unlocked condition. The angular position of the seat back 14 can now be freely adjusted.

Once the desired position of the seat back 14 is obtained the seat occupant releases the recliner lever 24. Releasing the recliner lever 24 allows the master recliner 18 to automatically actuate from the unlocked condition to the locked condition, which causes the cross-talk tube 22 to rotate in the counterclockwise direction (when viewed from FIG. 2). At the same time, referring to the slave recliner 20, the springs 42 urge the cam 40 to rotate in the counterclockwise direction toward the locked position. As the cam 40 rotates in the counterclockwise direction, the hook end 80 of the second lobes 78 disengages from the release hook 74 on the pawls 38 and the first 76 and second 78 lobes of the cam 40 abut the respective lobes 70, 72 of the pawls 38, pushing the pawls 38 outward. When the cam 40 is in the locked position the teeth 66 on the pawls 38 are meshingly engaged with the teeth 58 on the rotary plate 34 and the slave recliner 20 is in the locked condition. The seat back 14 can no longer be pivotally adjusted.

Due to manufacturing tolerances and relative alignment of the master 18 and slave 20 recliners, it is possible that once the recliner lever 24 is released the master recliner 18 will return to the locked condition while the slave recliner 20 will remain in the unlocked condition. For example, the slave recliner 20 remains in the unlocked condition when the tips of the teeth 66 on the pawls 38 abut the tips of the teeth 58 on the rotary plate 34. This is referred to as a tip-to-tip or tooth-to-tooth condition. In the tooth-to-tooth condition, since the teeth 66 on the pawls 38 are not meshingly engaged with the teeth 58 on the rotary plate 34, the cam 40 is not in the locked position. However, because the spring bushing 28 is disposed between the cross-talk tube 22 and the cam 40, the biasing tabs 92 of the spring bushing 28 provide a lost motion connection allowing the cross-talk tube 22 to continue to rotate in the counterclockwise direction without the cam 40 rotating in the counterclockwise direction. The cross-talk tube 22 continues to rotate in the counterclockwise direction until the master recliner 18 is in the locked condition. The reactionary forces F then urge the cam 40 to rotate in the counterclockwise direction until the drive surfaces 98 of the cam 40 abut the cross-talk tube 22 and the slave recliner 20 is in the locked condition.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed is:

1. A vehicle seat including a seat back, a seat cushion and a pair of recliners hingedly mounting said seat back to said seat cushion enabling pivotal movement of the seat back relative to the seat cushion, said vehicle seat comprising:
   a first recliner operable between a locked condition wherein the seat back is fixed relative to the seat cushion and an unlocked condition wherein the seat back is selectively pivotally adjustable;
   a second recliner operable between said locked and unlocked conditions in response to said first recliner operating between said locked and unlocked conditions respectively; and
   a rod ganging said first and second recliners together to synchronize actuation of said first and second recliners to said unlocked condition upon rotation of said rod in a first direction, said rod being fixedly coupled to said first recliner and operatively coupled to said second recliner;
   said operative coupling characterized by a bushing disposed between said second recliner and said rod biasing said second recliner against said rod providing a lost motion connection between said first and second recliners for allowing said first and second recliners to lock independently and for engaging said rod to urge said second recliner to return to said locked condition independent from said first recliner upon rotation of said rod in a second direction opposite said first direction.

2. A vehicle seat set forth in claim 1, wherein said rod has a generally rectangular cross-sectional shape and said bushing includes a tubular sleeve body surrounding said rod and extending axially between an inner end and an outer end, said bushing having a pair of opposing and offset biasing tabs extending axially from said inner end of said sleeve body for engaging opposing sides of said rod to urge a distal end of said rod into engagement with said second recliner.

3. A vehicle seat as set forth in claim 2, wherein said bushing includes a pair of opposing and offset retaining tabs extending axially from said outer end of said sleeve body opposite said biasing tabs for coupling said bushing, to said second recliner and for urging said second recliner to return to said locked condition upon rotation of said rod in said second direction.

4. A vehicle seat as set forth in claim 3, wherein said second recliner has a cam that receives said bushing, said cam rotates to effect operation of said second recliner between said locked and unlocked conditions, said bushing urging said cam into a position ready to effect operation of said second recliner from the locked to the unlocked condition.

5. A vehicle seat as set forth in claim 4, wherein said cam includes a center bore shaped to matingly receive said bushing therethrough, said center bore having a pair of opposing retaining surfaces for receiving said respective pair of retaining tabs and said bushing includes a step formed in each of said retaining tabs for snappingly engaging said cam to couple said bushing to said second recliner.

6. A vehicle seat as set forth in claim 5, wherein said bushing has a pair of holding tabs extending axially from said inner end of said sleeve body and alternating between said pair of biasing tabs for engaging opposing sides of said rod.

7. A vehicle seat as set forth in claim 6, wherein said center bore of said cam includes a pair of opposing guide surfaces alternating between said pair of retaining surfaces and said bushing has a pair of guide tabs extending through said guide surfaces for aligning and guiding said bushing into engagement with said cam of said second recliner.

8. A vehicle seat as set forth in claim 7, wherein said center bore of said cam includes a pair of drive surfaces alternating between said retaining surfaces and said guide surfaces for engagement by said rod upon rotation in said first direction to actuate said second recliner to said unlocked condition.

9. A vehicle seat as set forth in claim 8, wherein said rod includes a pair of opposed concave sides for engaging said biasing tabs and a pair of opposed convex sides alternating between said concave sides for engaging said holding tabs of said bushing.

10. A recliner assembly for providing pivotal movement of a seat back relative to a seat cushion of an automotive vehicle seat, said recliner assembly comprising:
a rotatable rod extending between a first end and a second end, said second end having a generally rectangular shape;
a first recliner fixedly coupled to said first end of said rod, said first recliner operable between a locked condition wherein the seat back is fixed relative to the seat cushion and unlocked condition wherein the seat back is selectively pivotally adjustable;
a second recliner operatively coupled to said second end of said rod, said second recliner operable between said locked and unlocked conditions; and
a bushing disposed between said second recliner and said rod for biasing said second recliner against said rod to synchronize said first and second recliners to unlock simultaneously in response to rotation of said rod in a first direction and providing a lost motion connection for allowing said first and second recliners to lock independently and urging said second recliner to return to said locked condition independent from said first recliner in response to rotation of said rod in a second direction opposite said first direction.

11. A recliner as set forth in claim 10, wherein said second recliner has a cam that receives said bushing, said cam rotates to effect operation of said second recliner between said locked and unlocked conditions, said bushing urging said cam into a position ready to effect operation of said second recliner from the locked to the unlocked condition.

12. A recliner assembly as set forth in claim 11, wherein said bushing includes a tubular sleeve hod surrounding said rod and extending axially between an inner end and an outer end, said bushing has a pair of opposed and offset biasing tabs extending axially from said inner end of said sleeve body for engaging opposite sides of said rod.

13. A recliner assembly as set forth in claim 12, wherein said bushing has a pair of opposing and offset retaining tabs extending axially from said outer end of said sleeve body opposite said biasing tabs for coupling said bushing to said second recliner and for urging said second recliner to return to said locked condition in response to rotation of said rod in said second direction.

14. A recliner assembly as set forth in claim 13, wherein said cam includes a center bore shaped to matingly receive said bushing therethrough, said center bore having a pair of opposing retaining surfaces for receiving said respective pair of retaining tabs and said bushing includes a step formed in each of said retaining tabs for snappingly engaging said cam to couple said bushing to said second recliner.

15. A recliner assembly as set forth in claim 14, wherein said bushing has a pair of holding tabs extending axially from said inner end of said sleeve body and alternating between said pair of biasing tabs for engaging opposing sides of said rod.

16. A recliner assembly as set forth in claim 15, wherein said center bore of said cam includes a pair of opposing guide surfaces alternating between said pair of retaining surfaces and said bushing has a pair of guide tabs extending through said guide surfaces for aligning and guiding said bushing into engagement with said cam of said second recliner.

17. A recliner assembly as set forth in claim 16, wherein said second recliner comprises:
a fixed plate configured to be mounted to the seat cushion;
a rotary plate configured to be mounted to the seat back and rotatably coupled to said fixed plate;
at least one pawl mounted between said fixed and rotary plates, said pawl movable between an engaged position securing said rotary plate relative to said fixed plate thereby defining a locked condition of said recliner wherein the seat back is fixed relative to the seat cushion and a disengaged position allowing movement of said rotary plate relative to said fixed plate thereby defining an unlocked condition of said recliner wherein the seat back is selectively pivotally adjustable;
said cam being rotatably mounted between said fixed and rotary plates for engagement with said pawl, said cam rotatable between a locked position wherein said pawl is in said engaged position and an unlocked position wherein said pawl is in said disengaged position; and at least one spring extending between said fixed plate and said cam for biasing said cam to said locked position.

18. A recliner assembly as set forth in claim 17 wherein said rotary plate includes a circumferential flange having a plurality of inner teeth disposed therearound and said pawl includes a first end having a plurality of teeth and a second end having a plurality of lobes, said pawl movable between said engaged position wherein said teeth are meshingly engaged with said inner teeth and said disengaged position wherein said teeth are spaced from said inner teeth and said cam includes a plurality of lobes for engagement with said plurality of lobes of said pawl as said cam rotates to move the pawl between said engaged and disengaged positions.

* * * * *